United States Patent Office
3,505,277
Patented Apr. 7, 1970

3,505,277
HIGH TEMPERATURE RESISTANT
POLYMER COMPOSITES
John W. Soehngen, Berkeley Heights, N.J., assignor to
Celanese Corporation, New York, N.Y., a corporation
of Delaware
No Drawing. Filed Nov. 7, 1967, Ser. No. 681,119
Int. Cl. C08g 41/02, 51/16
U.S. Cl. 260—37
9 Claims

ABSTRACT OF THE DISCLOSURE

Reinforced high temperature composites are made by embedding highly drawn, temperature resistant fibers of polybisbenzimidazobenzophenanthroline (BBB polymer) in a matrix formed from a BBB polymer solution. More particularly, the matrix can be cast on the reinforcing fiber elements from a sulphuric acid dope or solution and then precipitated in place by an appropriate medium such as sulphuric acid/water bath or a glycol bath, whereby the BBB polymer is hardened about the BBB fibers. The structure is then washed acid-free, dried, and converted into a solvent and high temperature resistant form by a short heat treatment.

BACKGROUND OF INVENTION

In recent years, the production of various structures from plastic materials capable of resisting high temperatures has attracted considerable attention in connection with the construction of space vehicles and particularly in connection with parts such as para wing structures for re-entry vehicles and the like. Polymers of the benzimidazobenzophenanthroline type have shown promise in this connection. However, while fibers prepared from this type of polymer by drawing have shown superior tensile properties and strength retention ability at temperatures as high as 800° C. or more, it has heretofore been difficult to fabricate coherent shaped structures from such polymers possessing the desired high-tensile properties at both normal ambient temperature and at elevated temperatures such as encountered in re-entry from outer space into the atmosphere.

SUMMARY OF INVENTION

A new process has now been discovered whereby the desired properties can be obtained by forming composites wherein a BBB polymer matrix is reinforced by being formed around reinforcing fiber elements of highly drawn BBB polymer fibers. This system has the essential characteristic that the reinforcing elements and the matrix are fully compatible and essentially identical in chemical composition when the processing of the composite structure is finished. At the same time, the fact that the fibers used as reinforcing elements are preconditioned by high temperature drawing prior to being embedded in the matrix results in their being resistant to adverse solvent and temperature effects during processing.

The high degree of compatibility between the reinforcing elements and the matrix of the present system minimizes strains at the interface therebetween and thereby strengthens the structure and makes it more resistant to failure. By contrast, when the composition of reinforcing elements is different from that of the matrix, similar compatibility cannot be achieved and consequently strains at the interface and eventual failure in surface are much more likely to occur.

DESCRIPTION OF INVENTION

The polymers useful in the present invention are poly-(aroylenebenzimidazoles) or, more particularly, poly(bisbenzimidazobenzophenanthroline), herein referred to as BBB poylmers. These polymers are made by mixing and condensing (1) at least one organic tetra-amine having the structural formula

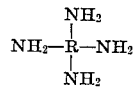

wherein R is a monocyclic or bicyclic aromatic or cycloaliphatic tetravalent hydrocarbon radical and each of the four amino groups is attached directly to a carbon atom of a ring of said aromatic or cycloaliphatic radical ortho or peri (in the case of a bicyclic radical) to the carbon atom to which another amino group is directly attached; with (2) at least one tetracarboxylic acid (which also may be in the form of the corresponding dianhydride) having the structural formula

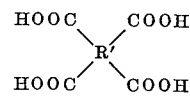

wherein R' is a tetravalent radical containing at least 2 carbon atoms and no more than 2 carboxy or carbonyl groups of said acid or anhydride are attached to any one carbon atom of said tetravalent radical.

As is now otherwise well known in the art, the reaction involved in the formation of these polymers may be effected in an organic liquid which is a solvent for at least one of the reactants, and is inert to the reactants, preferably under anhydrous conditions, at a temperature below 125° C., preferably at below 100° C., and for a time sufficient to provide the desired condensation product without gelation. Subsequent high temperature heating is required to completely cyclize the polymer. The tetra-amine and tetracarboxy acid or corresponding dianhydride are preferably reacted in substantially equimolar quantities. Alternatively, the polymerization may be effected in an inorganic solvent such as polyphosphoric acid by heating at temperatures of 100° to 250° C. for a sufficient time to produce the desired molecular weight.

If an excessive reaction temperature is used, a product which is difficult or impossible to shape is obtained. But the permissible upper temperature limit will vary depending upon the monomer and solvent system used, the mutual proportions of the monomers, and the concentration in the polymerization mixture and the minimum time that one desires for the reaction. The particular polymerization temperatures that should not be exceeded if a particular system is desired to provide a reaction product composed of a shapable polymer will accordingly vary from system to system but can be determined for any given system by a simple test by any person of ordinary skill in the art.

It is preferred that the molecular weight of the polymer used herein be such that its inherent viscosity be at least 0.3, preferably 0.5 to 5.0. The inherent viscosity is measured at 25° C. at a concentration of 0.4 g. of polymer per 100 ml. of solvent. Ninety-seven percent sulphuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$\text{I.V.} = \ln \frac{\dfrac{V_1}{V_a}}{C}$$

In the above formula, $V_1$ is the viscosity of the solution, $V_a$ is the viscosity of the solvent, and C is the concentration expressed in grams of polymer per 100 ml. of solution. As is known in the polymer art, inherent viscosity is monotonically related to the molecular weight of the polymer.

Non-limiting examples of the tetra-amine monomers which may be used individually or in mutual admixture in forming the desired polymers are:

3,3'-diaminobenzidine;
bis(3,4-diamino phenyl) methane;
1,2-bis(3,4-diamino phenyl)ethane;
2,2-bis(3,4-diamino phenyl) propane;
bis(3,4-diamino phenyl) ether;
bis(3,4-diamino phenyl)sulfide;
bis(3,4-diamino phenyl)sulfone;
1,2,4,5-tetra-amino benzene;
2,3,6,7-tetra-amino naphthalene; etc.;

and the corresponding ring-hydrogenated tetra-amines.

Non-limiting examples of the tetracarboxylic acids include:

pyromellitic acid;
2,3,6,7-naphthalene tetracarboxylic acid;
3,3',4,4'-diphenyl tetracarboxylic acid;
1,4,5,8-naphthalene tetracarboxylic acid;
2,2',3,3'-diphenyl tetracarboxylic acid;
2,2-bis(3,4-dicarboxyphenyl) propane acid;
bis(3,4-dicarboxyphenyl) sulfone acid;
3,4,9,10-perylene tetracarboxylic acid;
bis(3,4-dicarboxyphenyl) ether acid;
ethylene tetracarboxylic acid;
naphthalene-1,2,4,5-tetracarboxylic acid;
decahydronaphthalene-1,4,5,8-tetracarboxylic acid;
4,8-dimethyl-1,2,3,5,6-hexahydronaphthalene-1,2,5,6-tetracarboxylic acid;
2,6-dichloronaphthalene-1,4,5,8-tetracarboxylic acid;
2,7-dichloronaphthalene-1,4,5,8-tetracarboxylic acid;
2,3,6,7-tetrachloronaphthalene-1,4,5,8-tetracarboxylic acid;
phenanthrene-1,8,9,10-tetracarboxylic acid;
cyclopentane-1,2,3,4-tetracarboxylic acid;
pyrrolidine-2,3,4,5-tetracarboxylic acid;
pyrazine-2,3,5,6-tetracarboxylic acid;
2,2-bis(2,3-dicarboxyphenyl) propane acid;
1,1-bis(2,3-dicarboxyphenyl) ethane acid;
1,1-bis(3,4-dicarboxyphenyl) ethane acid;
bis(2,3-dicarboxyphenyl) methane acid;
bis(3,4-dicarboxyphenyl) methane acid;
bis(3,4-dicarboxyphenyl) sulfone acid;
benzene-1,2,3,4-tetracarboxylic acid;
1,2,3,4-butane tetracarboxylic acid;
thiophene-2,3,4,5-tetracarboxylic acid;

and similar acids, as well as the dianhydrides of such acids.

In a preferred embodiment, the present invention is directed to fibers formed from poly(bisbenzimidazobenzophenanthroline), i.e., BBB polymers. Such polymers are formed from 1,4,5,8-naphthalene tetracarboxylic acid and 3,3'-diamino benzidine according to Equation A:

(A)

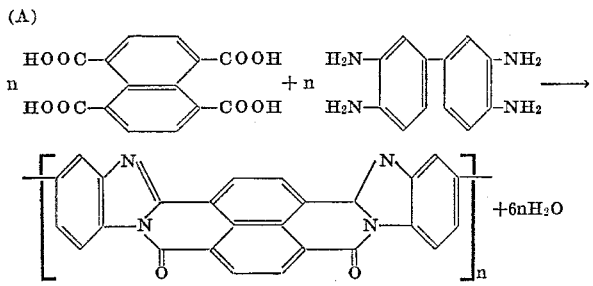

A preferable method of preparing BBB polymers includes effecting the polymerization in polyphosphoric acid (PPA) where the reaction according to Equation A occurs producing fully cyclized polymer. Use of polyphosphoric acid as the solvent permits reactions to be carried out over a wide range of temperatures, e.g., 80° C. to 300° C.

The polyphosphoric acid preferably employed has a $P_2O_5$ equivalent of about 82% to 84% which is a solution of approximately 5% to 20% ortho- and pyrophosphoric acids mixed with various polyphosphoric acids, mostly trimers, tetramers, pentamers and hexamers.

Both reaction temperature and reaction periods significantly affect degrees of polymerization. Generally, reaction times range from 0.5 to 100 hours at the above mentioned reaction temperatures. Higher reaction temperatures tend to result in polymer products having higher intrinsic viscosity than polymers produced at lower temperatures and at comparable reaction times. If the polymerization reaction is carried only to an intermediate stage, a solution containing the intermediate amine-substituted polyamide acids in the form of a tractable polymer can be cast into a film or dry spun through a spinneret or otherwise converted into the desired polymer shapes. On the other hand, if the polymerization is carried more nearly to completion by extensive heating, a dark red, insoluble solid is formed which precipitates from the solution and can be separated by filtration. Such a polymer can be characterized as being tough, that is, extremely difficult to grind. A typical pulverized sample is completely amorphous by X-ray diffraction and has no softening point up to 450° C., the limiting temperature of the apparatus used. Solutions of these polymers in concentrated sulphuric acid, polyphosphoric acid, benzene sulphonic acid, or methane sulphonic acid are intensively red. Aqueous KOH solutions are brown. BBB polymers cyclized by heat appear to be essentially insoluble in dimethylformamide, dimethylacetamide, dimethylsulphoxide, cresol, tetramethylene sulphone, hexamethyl phosphoramide and other common organic solvents. Low viscosity polymers exhibit some tendencies to dissolve in perfluoroacetic acid and formic acid.

As has been previously described in the art, the polymers of the type described can be formed into filaments by wet-spinning methods, i.e., extruding a solution of the polymer in an appropriate solvent, such as sulphuric acid, through an opening of predetermined shape into a coagulation bath, e.g., sulphuric acid/water coagulation bath, which results in a filamentary material of the desired cross-section.

Polymer solutions may be prepared, for example, by dissolving sufficient polymer in the solvent to yield a final solution suitable for extrusion which contains about 2% to 15% by weight, preferably about 3% to 10% by weight, of polymer based on the total weight of the solution. It is found that the polymer dissolves most readily on warming to a temperature of between about 50° to 70° C. to produce a viscous, deep purple solution. If sulphuric acid is employed, from 85 to 107 equivalent weight percent sulphuric, preferably 92 to 102 equivalent weight percent sulphuric acid, is employed as the solvent. The polymeric spinning solution is then extruded into a coagulation bath, i.e., wet spun, to form the filaments required in the practice of the present invention.

To produce filaments of superior properties, it is desirable to extrude the polymeric spinning solution into a coagulation bath which is maintained within certain parameters. More particularly, when spinning a polymeric solution having an intrinsic viscosity between about 1.0 and 4.0, using a sulphuric acid/water coagulation bath, it is desirable to maintain such a bath at a temperature between about 45° and 80° C., preferably about 55° and 70° C., and to maintain the sulphuric acid concentration in the bath between about 50% and 80% by weight, optimally 72% to 75% by weight. When operating within these parameters, a precursor (as-spun) fiber is obtained which is suitable for producing after-drawn fibers of superior tensile properties and strength retention at the extreme elevated temperatures for which the present invention is intended.

After extruding, the filaments are washed thoroughly in order to remove excess acid and to minimize contamination. Then, they are dried prior to being drawn in order to improve their physical characteristics, e.g., tenacity, elongation, thermal resistance, etc. After-drawing of the spun filaments is desirably performed at temperatures of about 600° and 700° C. at a draw ratio of from about 1.1:1 to about 3:1. As is already known in the art, BBB fibers drawn in this manner have strength in excess of 3 grams per denier and have excellent resistance to heat as indicated, for instance, by their ability to resist the flame of a propane torch. In such a flame, the fibers merely glow but retain their shape and flexibility.

In accordance with this invention, the BBB fibers described above are used as reinforcing elements in a matrix composed of BBB polymer. The reinforcing BBB fibers can be arranged in the matrix in parallel arrangement as fibers, filaments or yarns, or they may be placed therein randomly or as woven structures.

After proper arrangement, the reinforcing elements are impregnated with the matrix of BBB polymer. This can be most easily applied as a sulphuric acid solution of the BBB polymer. For instance, after the composition is cast in this fashion, the BBB polymer can be precipitated from the dope by a 60–70% $H_2SO_4$ solution at 55° to 65° C.

Of course, other media known to precipitate or coagulate BBB polymer solutions as, for example $H_2SO_4$/glycol solutions, may be used instead of aqueous sulphuric acid solutions.

After coagulation of the polymer from the dope or the reinforcing elements distributed therein, the reinforced sheet or other structure is washed acid free, dried, then again heated briefly, e.g., for from 10 seconds to 2 minutes or more, in an oven at 300° to 700° C., preferably at about 550° to 650° C., to convert the coagulated BBB polymer to the same kind of heat resistant structure as the previously described fibers which are embedded therein. It should be noted that the hot drawing or an equivalent heat treatment of the reinforcing fibers prior to their impregnation with the acid bath, is necessary for optimum results since the preliminary heat treatment makes the BBB fibers insoluble in sulphuric acid and thereby assures their retention of their physical structure, producing maximum reinforcement in the final composite.

The invention is next illustrated in terms of a specific example:

Example

BBB polymer, i.e., the reaction product of 1,4,5,8-naphthalene tetracarboxylic acid and 3,3'-diaminobenzidine having an inherent viscosity of about 3.0 was dissolved in 97% sulphuric acid to form a spinning solution containing 3.5 weight percent solids. This solution was extruded from a bomb under pressure of 50 p.s.i. nitrogen through a spinneret having 10 orifices each of 100 microns in diameter into a coagulation bath. The coagulation bath was aqueous sulphuric acid of about 70% concentration and was maintained at about 65° C.

The resulting precursor yarn was washed 30 minutes in de-ionized water at 50° C., dried overnight in air at 25° C., and then drawn through a muffle furnace at about 600° C. in a draw ratio of about 2:1 at a speed yielding a furnace residence time of about 3 seconds.

The hot-drawn yarn was cut into 4-inch lengths and the cut fibers were then arranged in a roughly parallel fiber array about 1.25 inches in width. In this yarn-like array, the average distance between adjacent filaments was less than one filament diameter. The parallel fiber array was placed on a smooth glass plate and a dope solution of the polymer was then poured slowly over it. The dope solution, which had a viscosity of about 4000 poise, was formed by dissolving in 97% sulphuric acid a BBB polymer having the same characteristics as the polymer from which the reinforcing fiber array was formed. The dope was forced through the fiber array and leveled out with a spreading knife edge to give a total thickness of about 1/16 inch to 1/8 inch.

The above assembly of dope-impregnated fibers supported on the glass plate, was then immersed in a coagulation bath consisting of sulphuric acid/water (50% $H_2SO_4$) at 30° C. for about 15 minutes. The resulting precipitated, tough structure was washed in hot water (about 50° C.) containing a small quantity of sodium bicarbonate and then suspended in boiling water for about one hour. Finally, the structure was allowed to dry between two glass plates to prevent it from curling, giving a tough, flexible reinforced film. This was finally heated in an oven at about 650° C. for one minute. After such a heat treatment, the resulting film exhibited excellent strength retention on prolonged heating at temperatures as high as 800° C. and remained flexible at such elevated temperatures, without showing any evidence of separation between the matrix and reinforcing fibers.

The invention for which protection is sought is particularly pointed out in the appended claims.

I claim:

1. A reinforced, high-temperature resistant shaped article of a plastic composite which comprises polymer matrix having heat treated polymeric filamentary reinforcing elements embedded therein, both the said matrix and the said reinforcing elements being composed of like polymers each of which is the reaction product of (a) at least one tetra-amine having the formula

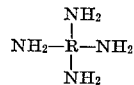

wherein R is an aromatic or cycloaliphatic tetravalent radical and wherein each amino group is attached directly to a carbon of said R radical in ortho or peri position to a carbon atom to which another amino group is directly attached, with (b) at least one carboxylic acid having the structural formula

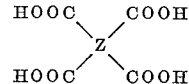

wherein Z is a tetravalent radical containing at least two carbon atoms and wherein no more than two carboxy groups are attached to any one carbon atom of said Z radical.

2. A reinforced composite article according to claim 1 wherein said polymers are poly(bisbenzimidazobenzophenanthroline) and wherein the reinforcing filaments made therefrom have a tenacity of at least 2 grams per denier.

3. A process which comprises making shaped plastic articles having good strength at temperatures above 400° C. which comprises (i) forming a reinforcing array from hot drawn filamentary elements composed of a polymeric reaction product of at least one tetra-amine with at least one tetracarbocyclic acid, said amine having the structural formula

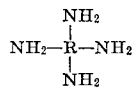

wherein R is an aromatic or cycloaliphatic tetravalent radical and wherein each amino group is attached directly to a carbon of said R radical in ortho or peri position to a carbon atom to which another amino group is directly attached, and said acid having the structural formula

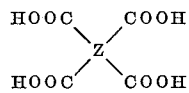

wherein Z is a tetravalent radical containing at least two carbon atoms and wherein no more than two carboxy groups are attached to any one carbon atom of said Z radical, (ii) impregnating said filamentary array with a solution containing a like polymeric reaction product as the one from which said filamentary elements were produced, and (iii) precipitating the last mentioned reaction product from the impregnating solution and thereby forming a composite wherein the reinforcing filamentary elements are embedded in a coherent matrix of polymeric binder.

4. A process according to claim 3 wherein both said filamentary elements and said matrix are composed of poly(bisbenzimidazobenzophenanthroline).

5. A process according to claim 3 wherein said filamentary elements are formed by extruding a solution of polymeric reaction product into a coagulation bath and drawing the resulting filaments at a temperature between about 600° and 800° C. and at a draw ratio of between 1.1:1 and 3:1, and wherein the composite containing said hot drawn filaments embedded in said matrix of polymeric binder is heated at a temperature between about 600° and 800° C.

6. A process according to claim 5 wherein both said filaments and said matrix are formed by precipitating poly(bisbenzimidazophenanthroline) from a concentrated sulfuric acid dope by contact with a coagulation bath containing a more dilute sulfuric acid solution.

7. A process according to claim 6 wherein said sulfuric acid dope contains between about 3 and 10 percent by weight of polymer characterized by an intrinsic viscosity between about 1.0 and 4.0.

8. A process according to claim 7 wherein said coagulating bath contains about 60 to 75 percent by weight sulfuric acid in water.

9. A process according to claim 7 wherein the hot drawn filaments which are subsequently impregnated have a tenacity of at least 2 grams per denier.

References Cited

UNITED STATES PATENTS

| | | |
|---|---|---|
| 3,067,482 | 12/1962 | Hollowell. |
| 3,228,790 | 1/1966 | Sexsmith et al. |
| 3,414,543 | 12/1968 | Paufler _____ 260—78.4 |

MORRIS LIEBMAN, Primary Examiner

L. T. JACOBS, Assistant Examiner

U.S. Cl. X.R.

117—140; 161—143; 260—823, 857; 264—129